US012557727B2

(12) United States Patent
    Cresswell et al.

(10) Patent No.: US 12,557,727 B2
(45) Date of Patent: Feb. 24, 2026

(54) APPARATUS FOR ADJUSTING SEED AND FERTILIZER DEPTHS

(71) Applicant: Bourgault Industries Ltd., St. Brieux (CA)

(72) Inventors: Mark Cresswell, St. Brieux (CA); Devin Lung, St. Brieux (CA)

(73) Assignee: Bourgault Industries Ltd., St. Brieux (CA)

(*) Notice: Subject to any disclaimer, the term of this patent is extended or adjusted under 35 U.S.C. 154(b) by 513 days.

(21) Appl. No.: 18/020,788

(22) PCT Filed: Mar. 4, 2021

(86) PCT No.: PCT/CA2021/050287
    § 371 (c)(1),
    (2) Date: Feb. 10, 2023

(87) PCT Pub. No.: WO2022/032373
    PCT Pub. Date: Feb. 17, 2022

(65) Prior Publication Data
    US 2023/0301225 A1      Sep. 28, 2023

(30) Foreign Application Priority Data
    Aug. 11, 2020    (CA) ...................................... 3089917

(51) Int. Cl.
    *A01C 7/20*      (2006.01)
    *A01C 5/06*      (2006.01)
    *A01C 7/06*      (2006.01)

(52) U.S. Cl.
    CPC .............. *A01C 7/203* (2013.01); *A01C 5/062* (2013.01); *A01C 5/068* (2013.01); *A01C 7/06* (2013.01)

(58) Field of Classification Search
    CPC .... A01C 7/203; A01C 7/06; A01C 5/062–068
    See application file for complete search history.

(56) References Cited

U.S. PATENT DOCUMENTS

| | | |
|---|---|---|
| 5,396,851 A | 3/1995 | Beaujot |
| 5,609,114 A | 3/1997 | Barton |

(Continued)

OTHER PUBLICATIONS

International Search Report and Written Opinion for PCT/CA2021/050287 mailed Apr. 9, 2021.

*Primary Examiner* — Tara Mayo
(74) *Attorney, Agent, or Firm* — Frost Brown Todd LLP; Nicole M. Tepe

(57) ABSTRACT

A seeding apparatus includes a trailing arm pivotally attached to an implement frame and a bias element exerting a downward bias force on the trailing arm. Fertilizer and seed furrow openers are attached to the trailing arm such that a seed furrow has a seed furrow depth less than a fertilizer furrow depth of a fertilizer furrow. A packer wheel is rotatably attached to a rear end of the trailing arm. A furrow controller is selectively operative to change the relative positions of the seed furrow opener, the fertilizer furrow opener, and the packer wheel to attain a desired one of a plurality of configurations where in each configuration the seed furrow has a seed furrow depth less than the fertilizer furrow depth to provide a separation distance. The seed depth and separation distance is quickly and conveniently increased in adverse soil conditions and decreased in favorable soil conditions.

12 Claims, 6 Drawing Sheets

(56) References Cited

U.S. PATENT DOCUMENTS

| | | | |
|---|---|---|---|
| 6,216,616 B1 * | 4/2001 | Bourgault | A01C 7/06 |
| | | | 111/194 |
| 7,159,523 B2 | 1/2007 | Bourgault et al. | |
| 7,261,048 B1 * | 8/2007 | Hantke | A01C 5/062 |
| | | | 111/151 |
| 7,549,481 B2 | 6/2009 | Lung et al. | |
| 8,909,436 B2 | 12/2014 | Achen et al. | |
| 2008/0308024 A1 * | 12/2008 | Lung et al. | A01C 7/201 |
| | | | 111/149 |
| 2011/0282556 A1 * | 11/2011 | Klenz et al. | A01C 7/203 |
| | | | 701/50 |
| 2018/0338411 A1 * | 11/2018 | Jagow | A01C 7/208 |

* cited by examiner

APPARATUS FOR ADJUSTING SEED AND FERTILIZER DEPTHS

CROSS REFERENCE TO RELATED APPLICATION

This application is a national stage entry of, and claims priority to PCT/CA2021/050287, entitled "Apparatus for Adjusting Seed and Fertilizer Depths," filed Mar. 4, 2021, the disclosure of which is incorporated by reference herein in its entirety and for all purposes.

FIELD OF THE INVENTION

This disclosure relates to the field of agriculture and in particular provides an apparatus for adjusting the location of seeds relative to the soil surface and relative to side banded fertilizers in changing soil conditions.

BACKGROUND

Trailing arm furrow opener assemblies are well known in the agricultural industry. These assemblies are spaced across the width of a seeding implement and each comprises a lengthy arm that is pivotally attached at the front end thereof to the implement frame about a horizontal pivot axis oriented perpendicular to the operating travel direction such that the arm can pivot up and down with respect to the frame. A packer wheel is mounted to a rear end of the arm and one or more furrow opener shanks extend downward from the arm forward of the packer wheel. A bias element such as a spring or hydraulic cylinder exerts a downward bias force on the arm to push the furrow opener mounted on the bottom of the shank into the soil to create a furrow, and the furrow depth is set by the relative positions of the packer wheel and furrow opener.

Such a trailing arm furrow opener assembly with a single furrow opener is disclosed in U.S. Pat. No. 7,159,523 to Bourgault et al. for depositing a single product in a single furrow. In many crops it is desirable to place at least some fertilizer closely adjacent to the seed so that the nutrients are available as soon as the seeds germinate and the plant begins to grow. In such a single furrow opener assembly it is common to dispense both seed and fertilizer into the same delivery conduit to form a mixed product and direct the mixed product into the single furrow.

U.S. Pat. No. 7,549,481 to Lung discloses a furrow opener bracket attached to the rear link of a parallel link assembly such that the furrow opener bracket and furrow opener attached thereto is maintained in a constant fore and aft angular orientation as the assembly moves up and down. A packer wheel arm is fixed to one of the upper and lower parallel arm members of the parallel link assembly, and extends rearward from the rear link, and a packer wheel is mounted to the packer wheel arm. A bias device exerts a downward force on the assembly. The presentation angle of the furrow opener with respect to the ground is maintained constant while the assembly moves up and down. Furrow depth adjustments can be made by raising or lowering the height of the implement frame above the soil surface.

U.S. Pat. No. 5,396,851 to Beaujot and U.S. Pat. No. 7,261,048 to Hantke disclose such an assembly with a trailing arm and packer wheel with front and rear furrow opener shanks attached to the trailing arm to deposit two products into two separate furrows. In the Beaujot apparatus, knife type furrow openers are attached to the bottom ends of the shanks to make two slightly laterally spaced furrows, one for seeds and the other for fertilizer, commonly granular fertilizer. U.S. Pat. No. 5,609,114 to Barton discloses a similar trailing arm with front and rear disc type furrow openers mounted to the arm.

These arrangements with two furrow openers typically place side-banded fertilizer in a fertilizer furrow made by the front furrow opener and seed in a seed furrow made by the rear furrow opener. It is generally desirable to place the seed in the furrow made by the rear furrow opener to avoid disturbing the seed once it is placed. Placement of the seed at a suitable depth is important to ensure germination and early emergence. The placement of the fertilizer is not as critical but it is important to maintain a safe separation distance between the seeds and fertilizer to avoid damage to the seeds that can be caused by the fertilizer.

In these trailing arms with front and rear furrow openers attached to the trailing arm the height of the implement frame above the soil surface is fixed however seed and fertilizer furrow depth changes may be required when changing crops to accommodate the different types of seed and may also be required to address the required safe separation distance between the seeds and fertilizer. Typically the seed furrow depth is adjusted by moving the packer wheel up or down with respect to the trailing arm, and if providing a desired separation distance requires a change, the fertilizer furrow depth is adjusted by moving the fertilizer furrow opener up or down with respect to the trailing arm.

This safe separation distance varies with numerous factors, especially the particular crop being seeded, and the particular fertilizer being used and the rate of fertilizer application. Fertilizers are essentially salts, and can adversely affect the ability of the seedling to absorb water and seedling desiccation can occur. Different fertilizers have different salt indexes or burn potential than others. Thus the type of fertilizer and rate of fertilizer application affects the safe separation distance, with lower rates allowing lower separation distances. Different fertilizers also move through the soil at different rates. Phosphate fertilizers move slower and so it is desirable to place these nearer to the seed, while nitrogen fertilizers move more readily and may be placed farther away without reducing their effectiveness.

Soil conditions that tend to concentrate salts, or stress the germinating seed, increase the potential for damage. So, the safe separation distance for a given rate of application of side-banded fertilization is increased with sandier soil texture and in drier soil conditions. Clay soils and soils with higher organic matter content hold onto moisture and moist soil can allow higher rates at the same separation distance, or the same rate with a lower separation distance. Also other environmental conditions that induce stress and slow germination, such as cold temperatures, can increase the likelihood of damage and so increase the safe separation distance.

The furrow openers are typically arranged such that the fertilizer furrow is somewhat deeper than the seed furrow and laterally spaced from the seed furrow. The depth of the seed and fertilizer furrows can be adjusted independently to suit various crops and fertilizer rates. In the arrangement shown by Hantke, both furrow opener shanks are adjustably fixed to the rear link of a parallel link trailing arm such that as the implement frame moves up and down with respect to the soil surface in rolling terrain, the seed and fertilizer furrows are maintained at a constant depth, and the separation distance between the seed and fertilizer is maintained constant as well. Each of the front and rear shanks is adjustable with respect to the rear link to independently change the depth of each of the seed and fertilizer furrows, and also the separation distance.

The arrangement of Hantke overcomes the problem of furrow depth variances when operating in rolling terrain. In the above furrow opener assemblies with a single trailing arm where the front and rear furrow opener shanks are attached to the trailing arm between the packer wheel and the pivotal connection to the frame, the frame height above the ground is fixed however the depth of each furrow will still vary significantly as the frame tilts when passing over rolling terrain and the actual height above the ground of each lateral frame member, to which the trailing arms are attached, varies.

Since the rear end of the trailing arm is maintained at a constant height by the packer wheel, as the front end of the trailing arm moves up and down with the frame in rolling terrain, the front furrow opener moves up and down to greater degree than the rear furrow opener, and so the separation distance between the seed and fertilizer also varies. It can also be seen that it is desirable to place the more depth sensitive seed furrow opener nearest to the packer wheel where variations are reduced, and the less depth sensitive fertilizer furrow opener ahead of the seed furrow opener. These variations are schematically illustrated in FIG. 6 of the Hantke U.S. Pat. No. 7,261,048.

U.S. Pat. No. 8,909,436 to Achen et al. discloses a system for sensing a variety of soil characteristics which are changing as the seeder moves across a field, and adjusting the depth of the seed furrow in response to sensed characteristics of the soil such as soil temperature, moisture content of soil, and soil type.

SUMMARY OF THE INVENTION

The present disclosure provides a seeding and fertilizing apparatus that overcomes problems in the prior art. Generally it is advantageous to place the fertilizer as close to the seeds as possible for any particular combination of crop types, fertilizer type, and fertilizer rate. While maintaining a safe separation distance between the seed and side-banded fertilizer is important to prevent seed damage, the safe separation distance will vary with soil conditions and also to some extent with temperature, as cold temperatures also stress the seeds.

The present disclosure provides an apparatus that can be quickly and conveniently adjusted to change both the separation distance and the depth of separate seed and fertilizer furrows to address changing soil conditions. In field surfaces where conditions are favorable the seed and fertilizer furrow depths, and the separation distance, can be reduced, and the depth of separate seed and fertilizer furrows and the separation distance can be increased where conditions are less favorable.

While many different soil conditions can be addressed, moisture is of significant importance when determining whether or not favorable soil conditions are present. Where the soil is moist, the safe separation distance is reduced and the present disclosure takes advantage of this by moving the fertilizer closer to the seed, where same is more readily available, and at the same time reduces seed depth to facilitate early emergence For example after a rain, a whole field surface may be moist and considered to exhibit favorable soil conditions allowing for a setting at reduced furrow depths and separation distance. As the soil surface dries the settings can be changed to increase the furrow depths and separation distance. Similarly changes can be made when moving from one field, where favorable conditions are present, to a different filed where less favorable or adverse soil conditions are present.

As a further example the present disclosure addresses the different soil conditions which are present in various parts of the field. As the seeding implement moves from one field portion into a less favorable soil condition in an adjacent field portion the separation distance and seed depth can, while moving along the field surface, be increased by moving the seed furrow opener downward, and by moving the fertilizer furrow opener downward to a greater degree than the seed furrow opener. In particular the adjacent field surface may be drier, with the moisture level located deeper and so the seeds are moved downward to reach the moisture in the soil, and the separation distance is simultaneously increased to provide a safety margin to reduce seed damage in the less favorable conditions where the seeds are under increased stress.

A further benefit of moving the fertilizer furrow opener deeper than the seed furrow opener is that moist soil from deeper in the soil surface is lifted by the fertilizer furrow opener and mixed with the drier soil above to improve soil moisture conditions in the seed furrow.

The present disclosure provides a seeding apparatus comprising a trailing arm pivotally attached at a front end of the trailing arm to an implement frame and a bias element operative to exert a downward bias force on the trailing arm. A fertilizer furrow opener is attached to the trailing arm and a seed furrow opener is attached to the trailing arm above and rearward of the fertilizer furrow opener such that a seed furrow formed by the seed furrow opener has a seed furrow depth less than a fertilizer furrow depth of a fertilizer furrow formed by the fertilizer furrow opener. A packer wheel is rotatably attached to a rear end of the trailing arm about a wheel rotational axis, and a distribution system is operative to dispense crop seeds into the seed furrow and fertilizer into the fertilizer furrow such that the seed and fertilizer are separated by a separation distance. A furrow controller is selectively operative to change the relative positions of the seed furrow opener, the fertilizer furrow opener, and the packer wheel to selectively attain, when seeding into a negative field portion, a negative furrow configuration where the seed furrow opener engages the field surface at a negative seed furrow depth and the fertilizer furrow opener engages the field surface at a negative fertilizer furrow depth that is greater than the negative seed furrow depth to provide a negative separation distance, and to attain, when seeding into a positive field portion, a positive furrow configuration where the seed furrow opener engages the field surface at a positive seed furrow depth that is less than the negative seed furrow depth and the fertilizer furrow opener engages the field surface at a positive fertilizer furrow depth that is less than the negative fertilizer furrow depth and greater than the positive seed furrow depth to provide a positive separation distance that is less than the negative separation distance.

The present disclosure thus provides an apparatus for varying seed and fertilizer depth, and the separation distance between the seed and fertilizer to suit varying crop types and soil conditions.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Soil conditions present in field surfaces can vary significantly from one field to another, but also in some agricultural areas such soil conditions vary significantly within a single field. Soil conditions, such as moisture, also vary significantly with weather. Moisture levels in a field surface can also vary with terrain, where lower areas are have more moisture than higher areas. Other soil conditions such as organic content, particulate size, and the like can also cause favorable or adverse conditions for crop growth. The present disclosure provides an apparatus for conveniently adjusting the depth of seed furrows and fertilizer furrows, and the separation distance between the seeds and fertilizers in those furrows.

Crops such as canola, wheat, peas, and the like each have their own characteristics such as desirable seeding depth, fertilizer requirements, sensitivity to fertilizer damage and the like, and such adjustments may be necessary to address changes in the crop being seeded.

Figure 1:
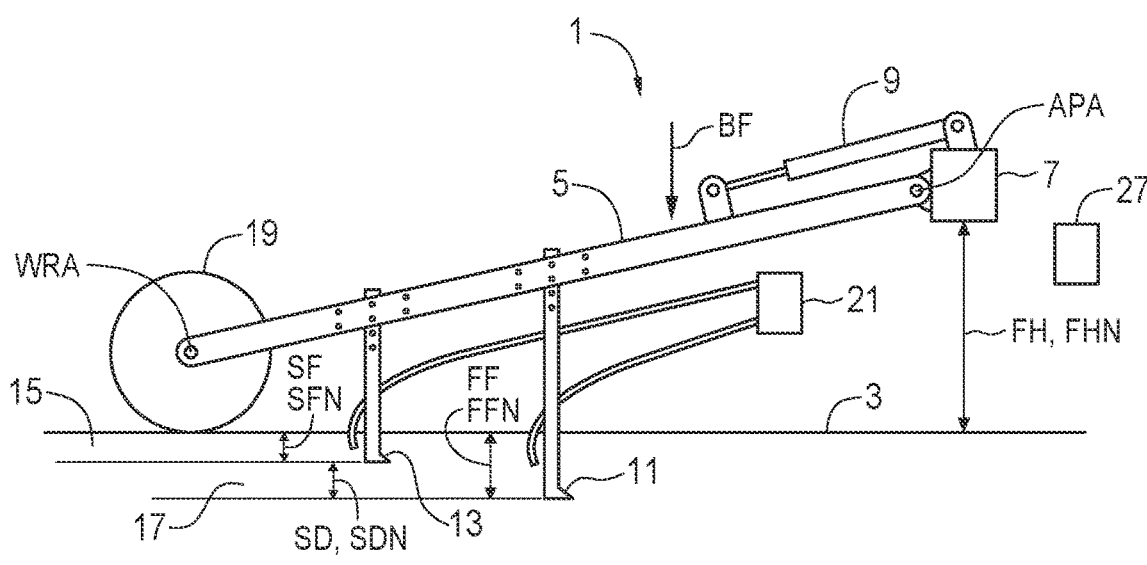
FIG. 1 is a schematic side view of an embodiment of the seeding apparatus of the present disclosure shown in a negative configuration.
Figure 2:
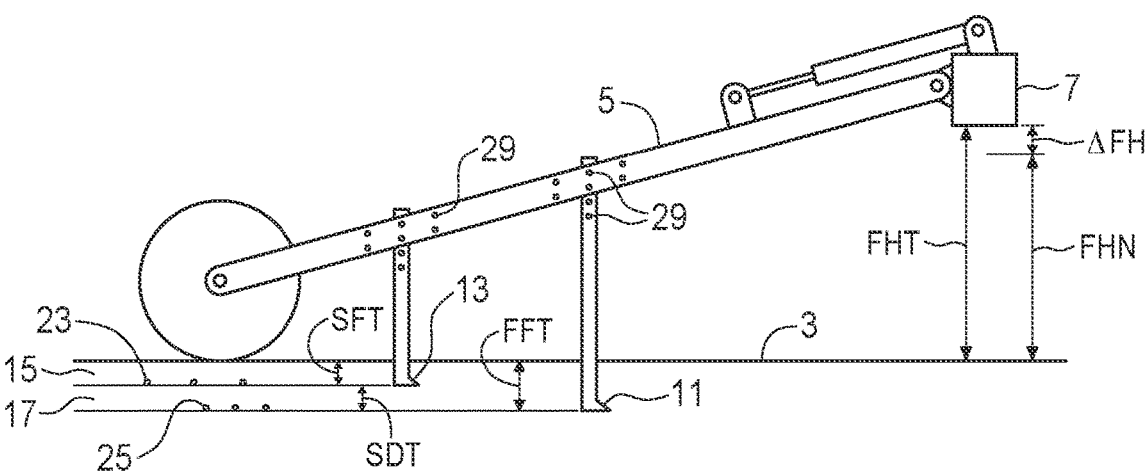
FIG. 2 is a schematic side view of the embodiment of FIG. 1 shown in a transitional configuration.
Figures 3, 4:
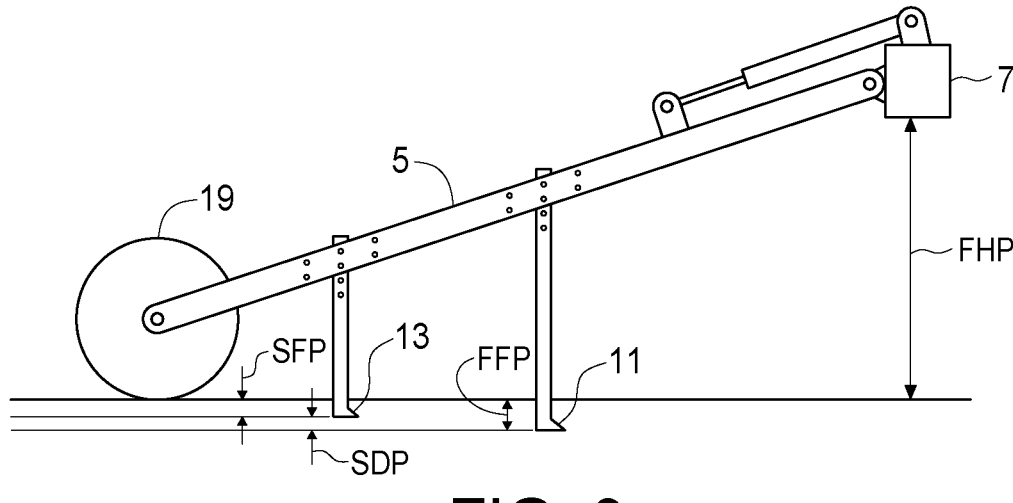
FIG. 3 is a schematic side view of the embodiment of FIG. 1 shown in a positive configuration.
FIG. 4 is a schematic top view of a field surface showing negative, positive, and transitional field portions with corresponding soil conditions.

FIGS. 1-3 schematically illustrate an embodiment of a seeding apparatus 1 of the present disclosure for quickly and conveniently adjusting seed depth and a separation distance SD between seeds and fertilizer to address changing crops and soil conditions.

The apparatus 1 comprises an arm member provided by a trailing arm 5 that is pivotally attached at a front end of the trailing arm to an implement frame 7 about an arm pivot axis APA and a bias element 9 operative to exert a downward bias BF force on the trailing arm 5. A fertilizer furrow opener 11 is attached to the trailing arm and a seed furrow opener 13 is attached to the trailing arm above and rearward of the fertilizer furrow opener 11 such that a seed furrow 15 formed by the seed furrow opener 13 has a seed furrow depth SF less than a fertilizer furrow depth FF of a fertilizer furrow 17 formed by the fertilizer furrow opener 11. It is also common for the seed furrow 15 to be laterally offset a small distance from the fertilizer furrow 17.

A packer wheel 19 is rotatably attached to a rear end of the trailing arm 5 assembly about a wheel rotational axis WRA, and a distribution system 21 is operative to dispense crop seeds 23 into the seed furrow 15 and fertilizer 25 into the fertilizer furrow 17 such that the seed and fertilizer are separated by a separation distance SD.

A furrow controller 27 is operative to change the relative positions of the seed furrow opener 13, the fertilizer furrow opener 11, and the packer wheel 19 as the seeding apparatus 1 seeds into the field surface 3 from a negative configuration shown in FIG. 1 for operations in fields where conditions are adverse or negative through a transitional configuration shown in FIG. 2 to a positive configuration shown in FIG. 3 for operations in fields where conditions are favorable or positive.

In the illustrated apparatus 1 the furrow controller 27 is operative to move the implement frame 7 upward and downward with respect to the field surface 3 to change the frame height FH. Thus in a negative configuration the implement frame 7 is supported at a frame height FHN as shown in FIG. 1. The implement frame 7 is raised through the frame height FHT shown in FIG. 2 to a frame height FHP to change from the negative configuration to the positive configuration. In a typical seeding implement of this type the wheels (not shown) supporting the implement frame 7 move up and down with respect to the implement frame to correspondingly move the implement frame 7 down and up with respect to the field surface 3. To ensure the desired frame height is maintained, shims can be provided to prevent the hydraulic cylinder from creeping. Hydraulic cylinders with position sensing and controls to maintain a desired position are also known in the art.

It can be seen that as the implement frame 7 moves upward while the packer wheel 19 remains on the ground, the seed and fertilizer furrow openers 13, 11 move upward with respect to the field surface so that the depth of the seed and fertilizer furrows 15, 17 is reduced. It can also be seen from the geometry of the illustrations that the fertilizer furrow opener 11 moves upward proportionately farther than the seed furrow opener 13. In the illustrated apparatus 1, the fertilizer furrow opener 11 is midway between the arm pivot axis APA and the wheel rotational axis WRA, with the result that as the implement frame moves upward by a distance FHT minus FHN=ΔFH from the position of FIG. 1 to the position of FIG. 2, the fertilizer furrow opener 11 moves up by only one half that distance AFH.

Similarly the seed furrow opener 13 is midway between the fertilizer furrow opener 11 and the wheel rotational axis WRA, with the result that as the implement frame moves upward by a distance AFH, and the fertilizer furrow opener 11 moves up by one half the distance AFH, the seed furrow opener 13 moves up by only one half the distance that the fertilizer furrow opener 11 moves up. Thus for example when the implement frame moves upward 4 inches, the fertilizer furrow opener moves up 2 inches, and the seed furrow opener moves up 1 inch. This proportional difference in vertical movement of the seed and fertilizer furrow openers 13, 11 as the frame height FH changes means that the separation distance SD between the seeds 23 in the seed furrow 15 and the fertilizer 25 in the fertilizer furrow 17 changes as well, decreasing as the implement frame and furrow openers move upward, and increasing as the implement frame and furrow openers move downward.

The present disclosure takes advantage of this relationship by moving the seeds closer to the surface for early emergence and at the same time moving the fertilizer closer to the seeds where conditions are favorable, and moving the seeds farther into the field surface while moving the fertilizer farther from the seeds where conditions are less favorable.

In adverse soil conditions the furrow controller 27 is operated to attain the negative furrow configuration of FIG. 1 where the seed furrow opener 13 engages the field surface at a negative seed furrow depth SFN and the fertilizer furrow opener 11 engages the field surface at a negative fertilizer furrow depth FFN that is greater than the negative seed furrow depth SFN to provide a negative separation distance SDN.

In favorable soil conditions the furrow controller 27 is operated to attain the positive furrow configuration of FIG. 3 where the seed furrow opener 13 engages the field surface at a positive seed furrow depth SFP that is less than the negative seed furrow depth SFN and the fertilizer furrow opener 11 engages the field surface at a positive fertilizer furrow depth FFP that is less than the negative fertilizer furrow depth FFN and greater than the positive seed furrow depth SFP to provide a positive separation distance SDP that is less than the negative separation distance SDN.

In the illustrated apparatus 1 the configuration of furrow depths and separation distance changes proportionately and continuously as the frame height changes from FHN to FHP, and any configuration between the configurations of FIG. 1 and FIG. 3 can be maintained to suit a particular soil condition. Thus in transitional soil conditions the furrow controller 27 can be operated to attain a transitional furrow configuration such as shown in FIG. 2 where the seed furrow opener 13 engages the field surface at a transitional seed furrow depth SFT that is between the negative and positive seed furrow depths SFN, SFP and the fertilizer furrow opener 11 engages the field surface at a transitional fertilizer furrow depth FFT that is between the negative and positive fertilizer furrow depths FFN, FFP to provide a transitional separation distance SDT that is between the negative and positive separation distances SDN, SDP.

In the illustrated apparatus 1 the seed furrow opener 13 and the fertilizer furrow opener 11 are releasably attached to the trailing arm 5 by fasteners through corresponding holes 29 such that the furrow depths and separation distance SD can be adjusted by changing the vertical distance between the trailing arm 5 and the seed and fertilizer furrow openers 13, 11.

The separation distance SD is also adjustable by changing locations of the seed and fertilizer furrow openers 11, 13 along a length of the trailing arm 5. For example the difference between the negative separation distance SDN and the positive separation distance SDP can be increased by increasing a distance between the locations of the seed and fertilizer furrow openers 13, 11 on the length of the trailing arm 5, and the difference between the negative separation distance SDN and the positive separation distance SDP can be decreased by decreasing the distance between the locations of the seed and fertilizer furrow openers 13, 11 on the length of the trailing arm 5.

Typically any adjustments such as setting minimum/maximum seed furrow depth, minimum/maximum separation distance, and the like for a particular crop are made when beginning to seed that crop, and then changes to suit soil conditions are made with the furrow controller 27.

Where the field surface has consistent and uniform soil conditions the seeding apparatus 1 will be operated over the whole of the field surface at a corresponding one of the configurations. When moving to a different field surface also with consistent and uniform soil conditions but which are different soil conditions, the seeding apparatus can be moved to a different configuration. Also for example after a rain the moisture conditions will change over time from a moist soil condition right at the surface to a moist condition deeper into the soil surface as the soil dries, and corresponding changes can be made to the configuration of the furrow openers.

In a field surface 3A such as schematically illustrated in FIG. 4 where the soil conditions vary in the same field from a negative condition FN to a transitional condition FT to a positive soil condition FP the furrow controller can be operated to change the relative positions of the seed furrow opener 13, the fertilizer furrow opener 11, and the packer wheel 19 to attain a desired furrow configuration as the seeding apparatus 1 seeds into the field surface.

Figure 5:
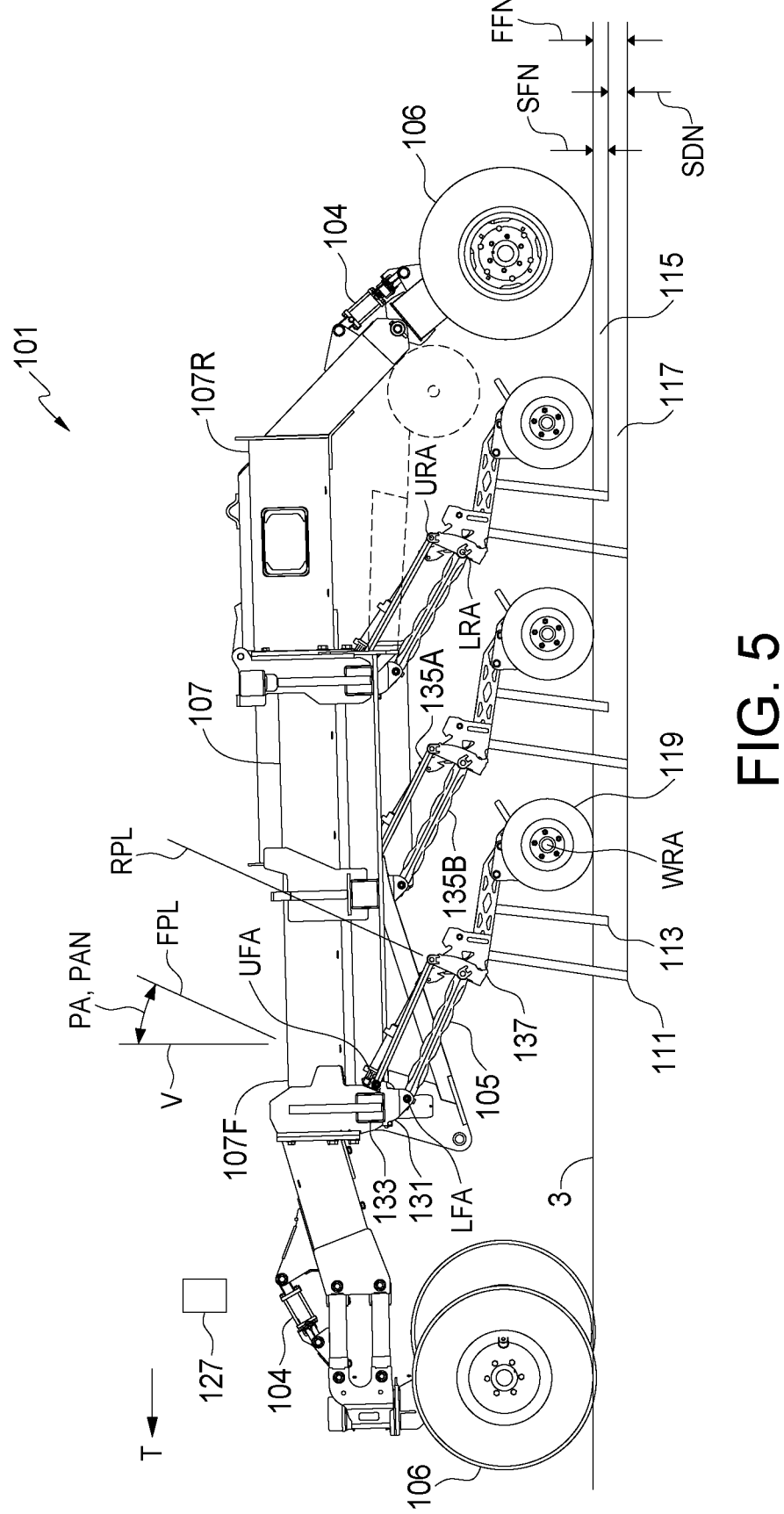
FIG. 5 is a schematic side view of an alternate embodiment of the seeding apparatus of the present disclosure shown in a negative configuration.
Figure 6:
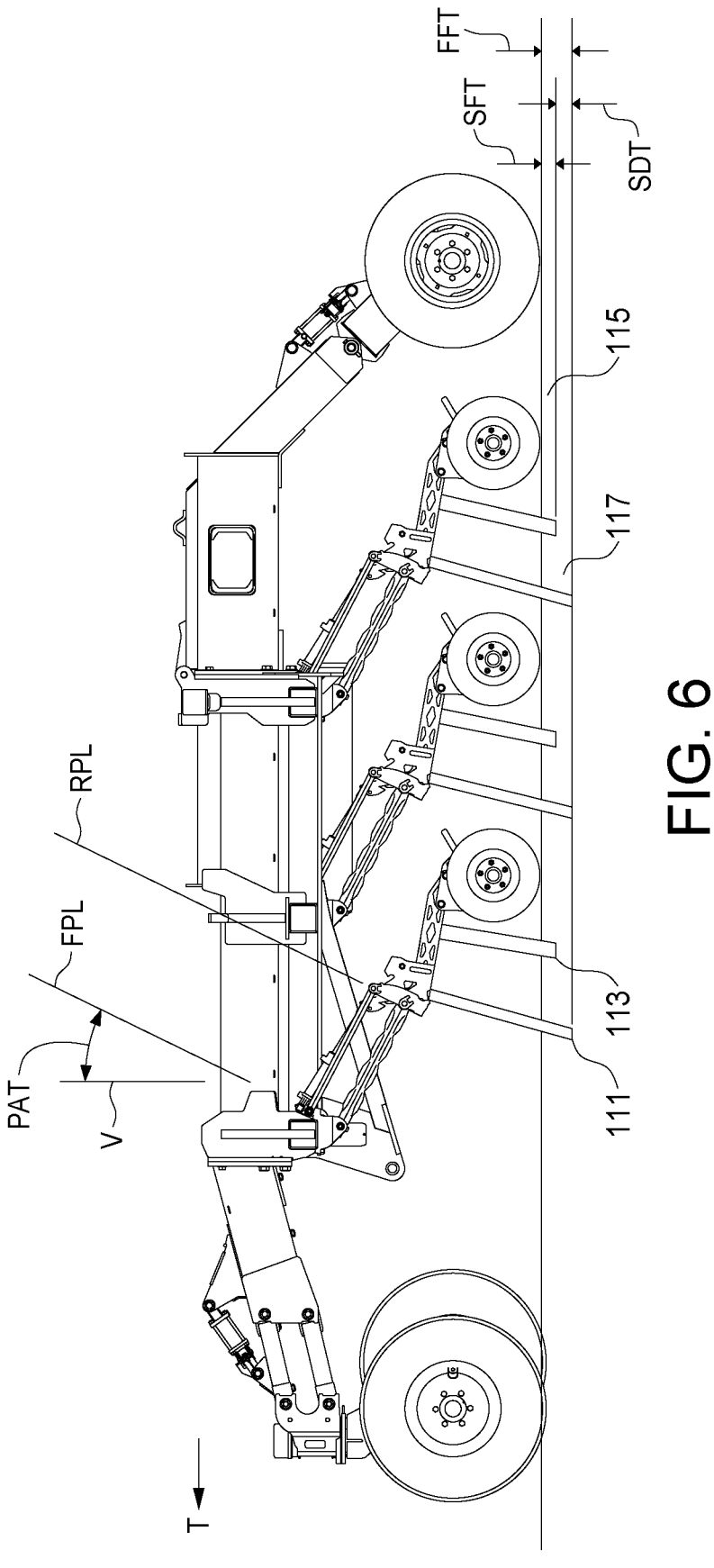
FIG. 6 is a schematic side view of the embodiment of FIG. 5 shown in a transitional configuration.
Figure 7:
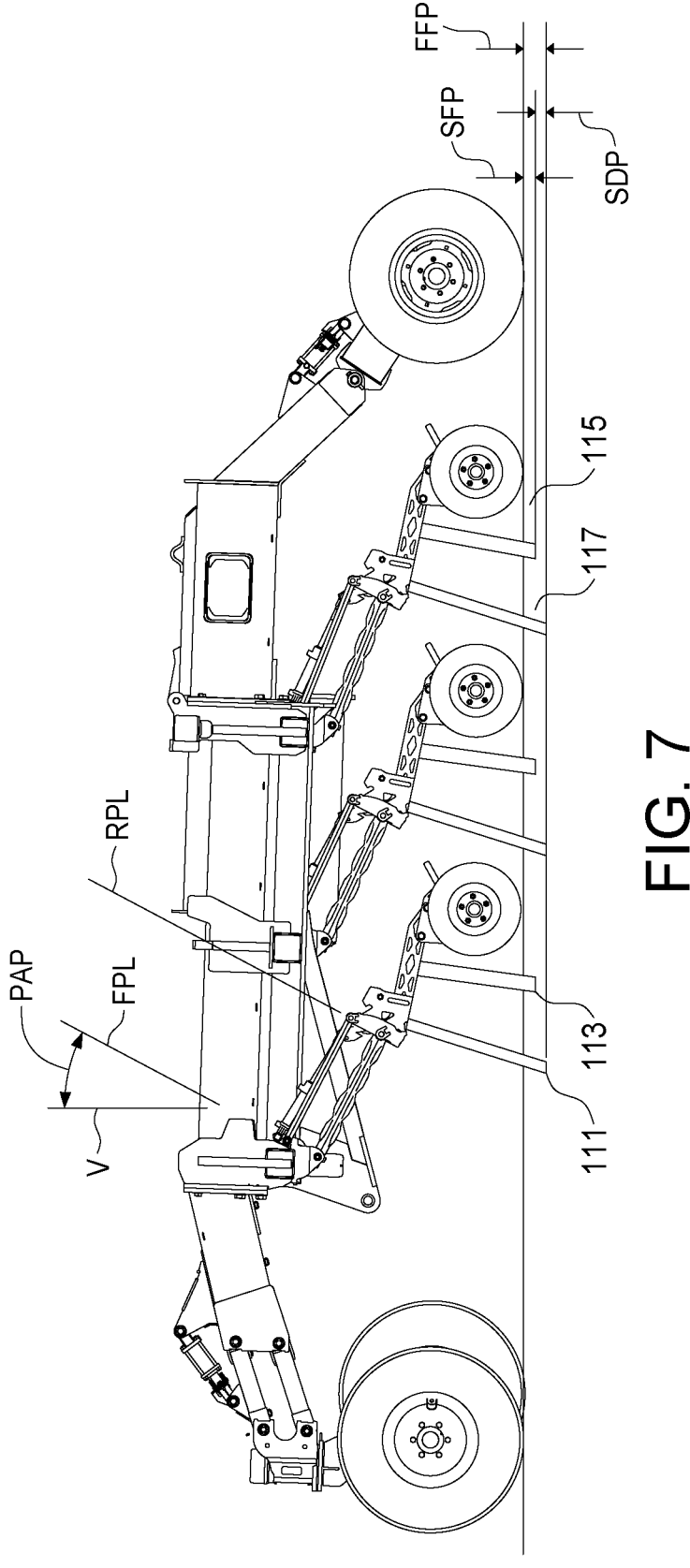
FIG. 7 is a schematic side view of the embodiment of FIG. 5 shown in a positive configuration.

FIGS. 5-7 illustrate an alternate embodiment of the seeding apparatus 101 of the present disclosure for optimizing seed depth and a separation distance SD between seeds and fertilizer as soil conditions change in a field surface 3. In the apparatus 101 the trailing arm assembly 105 comprises a parallel link trailing arm assembly comprising a front link member 131 fixed to a lateral frame member 133 of the implement frame 107, and upper and lower parallel arm members 135A, 135B pivotally attached at front ends thereof to the front link member about corresponding upper and lower front pivot axes UFA, LFA oriented substantially horizontally and perpendicular to an operating travel direction T, and pivotally attached at rear ends thereof to a rear link member 137 about corresponding upper and lower rear pivot axes URA, LRA oriented substantially parallel to the front pivot axes UFA, LFA such that the parallel arm members are parallel to each other.

In the trailing arm assembly 105 a front pivot line FPL connecting the upper and lower front pivot axes UFA, LFA is parallel to a rear pivot line RPL connecting the upper and lower rear pivot axes URA, LRA, and the front and rear pivot lines FPL, RPL are oriented at an adjustable pivot angle PA with respect to a vertical orientation V. The seed furrow opener 113, the fertilizer furrow opener 111, and the wheel rotational axis WRA are attached to the rear link rearward of the rear pivot line RPL such that the seed furrow opener 113, the fertilizer furrow opener 111, and the packer wheel 119 are fixed with respect to the rear link 137 during operation. The seed furrow openers 113 engage the field surface 3 to form seed furrows 115 and the fertilizer furrow openers 111 engage the field surface 3 to form fertilizer furrows 117.

In the apparatus 101, the furrow controller 127, typically comprising hydraulic power from the towing vehicle and hydraulic cylinders 104 connected to raise and lower the implement wheels 106, is operative to change the relative positions of the seed furrow opener 113, the fertilizer furrow opener 111, and the packer wheel 119 as the seeding apparatus 101 seeds into the field surface 3 by adjusting the pivot angle PA. In the apparatus 101 the furrow controller 127 adjusts the pivot angle PA with respect to the vertical orientation V by changing a vertical position of a front end 107F of the implement frame 107 with respect to a vertical position a rear end 107R of the implement frame 107. This change is accomplished with the furrow controller 127, typically a hydraulic control on the towing tractor, by extending or retracting the hydraulic cylinders 104 to move the wheels 106 up and down.

In the negative configuration shown in FIG. 5, where the seed furrow opener 113 engages the field surface 3 at a negative seed furrow depth SFN and the fertilizer furrow opener 111 engages the field surface at a negative fertilizer furrow depth FFN that is greater than the negative seed furrow depth SFN to provide a negative separation distance SDN, the front end 107F of the implement frame 107 is lower than the rear end 107R of the implement frame 107 and a front pivot line portion FPL that extends upward from the upper front pivot axis UFA slopes rearward with respect to the vertical orientation V at a pivot angle PA oriented at a negative pivot angle PAN with respect to the vertical orientation V.

To move to the positive configuration of FIG. 7 from the negative configuration of FIG. 5, the furrow controller tilts the pivot line FPL rearward by moving the front end of the implement frame 107F upward with respect to the rear end 107R so the pivot line FPL moves from the negative pivot angle PAN to a positive pivot angle PAP that is greater than the negative pivot angle PAN. As described above with respect to the apparatus 1, in the positive configuration the seed furrow opener 113 engages the field surface at a positive seed furrow depth SFP that is less than the negative seed furrow depth SFN and the fertilizer furrow opener 111 engages the field surface at a positive fertilizer furrow depth FFP that is less than the negative fertilizer furrow depth FFN to provide a positive separation distance SDP that is less than the negative separation distance SDN.

As in the apparatus 1 described above, in the illustrated apparatus 101 the configuration of furrow depths and separation distance also changes proportionately and continuously as the pivot angle PA changes from PAN to PAP, and any configuration between the configurations of FIG. 5 and FIG. 7 can be maintained to suit a particular soil condition. Thus in transitional soil conditions the furrow controller 127 can be operated to attain a transitional furrow configuration such as shown in FIG. 6 where the seed furrow opener 113 engages the field surface at a transitional seed furrow depth SFT that is between the negative and positive seed furrow depths SFN, SFP and the fertilizer furrow opener 111 engages the field surface at a transitional fertilizer furrow depth FFT that is between the negative and positive fertilizer furrow depths FFN, FFP to provide a transitional separation distance SDT that is between the negative and positive separation distances SDN, SDP.

Figure 8:
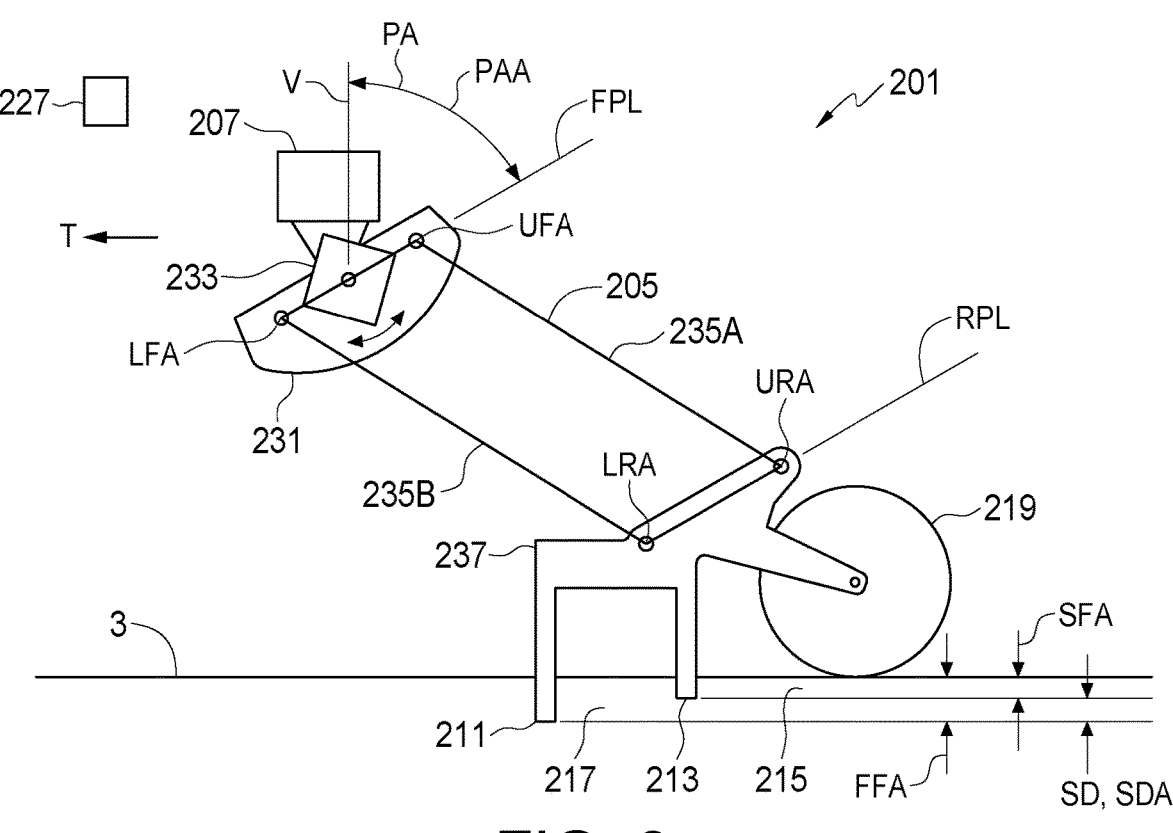
FIG. 8 is a schematic side view of a further alternate embodiment of the seeding apparatus of the present disclosure shown in a first configuration.
Figure 9:
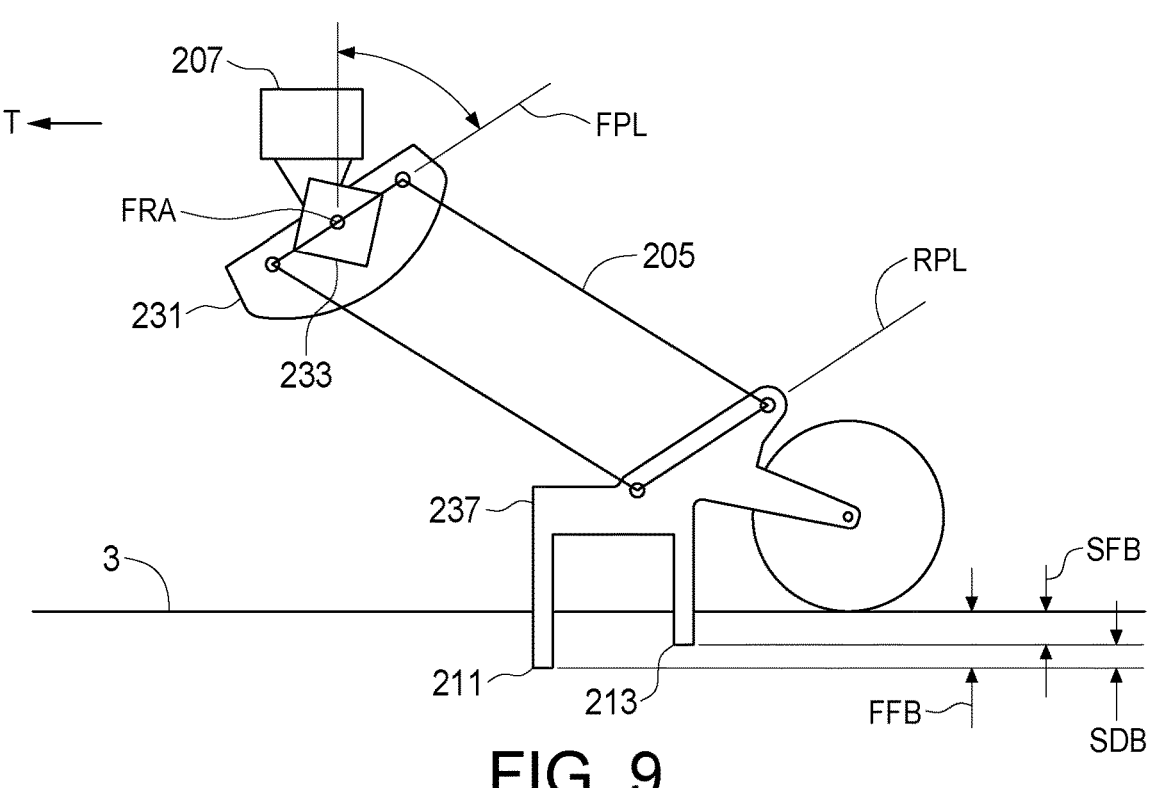
FIG. 9 is a schematic side view of the embodiment of FIG. 8 shown in a second configuration where the seed furrow, fertilizer furrow, and separation distance between the seed and fertilizer is increased.

FIGS. 8 and 9 schematically illustrate a further alternate embodiment of the seeding apparatus 201 of the present disclosure for optimizing seed depth and a separation distance SD between seeds and fertilizer as soil conditions change in a field surface 3. In the apparatus 201 the trailing arm assembly 205 again comprises a parallel link trailing arm assembly 205 comprising a front link member 231 fixed to a lateral frame member 233 of the implement frame 207, and upper and lower parallel arm members 235A, 235B pivotally attached at front ends thereof to the front link member about corresponding upper and lower front pivot axes UFA, LFA oriented substantially horizontally and perpendicular to an operating travel direction T, and pivotally attached at rear ends thereof to a rear link member 237 about corresponding upper and lower rear pivot axes URA, LRA oriented substantially parallel to the front pivot axes UFA, LFA such that the parallel arm members are parallel to each other.

In the trailing arm assembly 205 the front pivot line FPL connecting the upper and lower front pivot axes UFA, LFA is parallel to the rear pivot line RPL connecting the upper and lower rear pivot axes URA, LRA, and the front and rear pivot lines FPL, RPL are oriented at an adjustable pivot angle PA with respect to a vertical orientation V. The seed furrow opener 213, the fertilizer furrow opener 211, and the wheel 219 are attached to the rear link such that the seed furrow opener 213, the fertilizer furrow opener 211, and the packer wheel 219 are fixed with respect to the rear link 237 during operation. The seed furrow opener 213 engages the field surface 3 to form seed furrow 215 and the fertilizer furrow opener 211 engages the field surface 3 to form fertilizer furrow 217.

As in the apparatus 101 described above, the furrow controller 227 is operative to change the relative positions of the seed furrow opener 213, the fertilizer furrow opener 211, and the packer wheel 219 by adjusting the pivot angle PA. However in contrast to the apparatus 101, here the lateral frame member 233 is rotatably attached to the implement frame 207 about a frame rotational axis FRA oriented substantially horizontally and perpendicular to the operating travel direction T and the furrow controller 227 adjusts the pivot angle PA with respect to the vertical orientation V by rotating the lateral frame member 233.

FIG. 8 shows the apparatus 201 in a first configuration where the pivot angle PA is oriented at a first pivot angle PAA and where the seed furrow opener 213 engages the field surface 3 at a first seed furrow depth SFA and the fertilizer furrow opener 211 engages the field surface at a first fertilizer furrow depth FFA to provide a first separation distance SDA.

FIG. 9 shows the apparatus 201 in a second configuration where the seed furrow opener 213 engages the field surface 3 at a second seed furrow depth SFB that is greater than the first seed furrow depth SFA and the fertilizer furrow opener 211 engages the field surface at a second fertilizer furrow depth FFB that is greater than the first fertilizer furrow depth FFA and greater than the second seed furrow depth SFB to provide a second separation distance SDB that is less than the first separation distance SDA.

Also in contrast to the apparatus 101 described above, the seed furrow opener 213 and the wheel rotational axis WRA are attached to the rear link rearward of the rear pivot line RPL, and the fertilizer furrow opener 211 is attached to the rear link member 237 forward of the rear pivot line RPL. Placing the fertilizer furrow opener 211 forward of the rear pivot line RPL compared to rearward of the rear pivot line provides a different proportional relative movement of the furrow openers 211, 213 that may be advantageous in some applications.

As in the apparatuses 1 and 101 described above, in the illustrated apparatus 201 the configuration of furrow depths and separation distance also changes proportionately and continuously as the pivot angle changes, and any configuration between the configurations of FIG. 8 and FIG. 9 can be maintained to suit a particular soil condition.

The present disclosure thus provides an apparatus for varying seed and fertilizer depth, and the separation distance between the seed and fertilizer to suit varying crop types and soil conditions.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A seeding apparatus comprising:
   a trailing arm pivotally attached at a front end of the trailing arm to an implement frame and a bias element operative to exert a downward bias force on the trailing arm;
   a fertilizer furrow opener attached to the trailing arm and a seed furrow opener attached to the trailing arm rearward of the fertilizer furrow opener such that a seed furrow formed by the seed furrow opener has a seed furrow depth less than a fertilizer furrow depth of a fertilizer furrow formed by the fertilizer furrow opener;

a packer wheel rotatably attached to a rear end of the trailing arm about a wheel rotational axis;

a distribution system operative to dispense crop seeds into the seed furrow and fertilizer into the fertilizer furrow such that the seed and fertilizer are separated by a separation distance;

a furrow controller selectively operative to change the relative positions of the seed furrow opener, the fertilizer furrow opener, and the packer wheel to selectively attain:

when seeding into a negative field portion, a negative furrow configuration where the seed furrow opener engages the field surface at a negative seed furrow depth and the fertilizer furrow opener engages the field surface at a negative fertilizer furrow depth that is greater than the negative seed furrow depth to provide a negative separation distance; and when seeding into a positive field portion, a positive furrow configuration where the seed furrow opener engages the field surface at a positive seed furrow depth that is less than the negative seed furrow depth and the fertilizer furrow opener engages the field surface at a positive fertilizer furrow depth that is less than the negative fertilizer furrow depth and greater than the positive seed furrow depth to provide a positive separation distance that is less than the negative separation distance.

2. The apparatus of claim 1 wherein the furrow controller is operative to move the implement frame upward and downward with respect to the field surface, and wherein the implement frame is moved upward to change from the negative configuration to the positive configuration, and the implement frame is moved downward to change from the positive configuration to the negative configuration.

3. The apparatus of claim 1 wherein: the trailing arm comprises a parallel link trailing arm assembly comprising a front link member fixed to a lateral frame member of the implement frame, and upper and lower parallel arm members pivotally attached at front ends thereof to the front link member about corresponding upper and lower front pivot axes oriented substantially horizontally and perpendicular to an operating travel direction, and pivotally attached at rear ends thereof to a rear link member about corresponding upper and lower rear pivot axes oriented substantially parallel to the front pivot axes such that the parallel arm members are parallel to each other; a front pivot line connecting the upper and lower front pivot axes is substantially parallel to a rear pivot line connecting the upper and lower rear pivot axes, and the front and rear pivot lines are oriented at an adjustable pivot angle with respect to a vertical orientation; the seed furrow opener, the fertilizer furrow opener, and the wheel rotational axis are attached to the rear link member such that the seed furrow opener, the fertilizer furrow opener, and the packer wheel are fixed with respect to the rear link member during operation; the furrow controller is operative to change the relative positions of the seed furrow opener, the fertilizer furrow opener, and the packer wheel by adjusting the pivot angle.

4. The apparatus of claim 3 wherein a front pivot line portion extends upward from the upper front pivot axis and slopes rearward with respect to the vertical orientation at a negative pivot angle to attain the negative configuration and wherein the furrow controller is operative to change the relative positions of the seed furrow opener, the fertilizer furrow opener, and the packer wheel from the negative furrow configuration to the positive furrow configuration by tilting the front pivot line portion rearward to a positive pivot angle.

5. The apparatus of any one of claims 3 and 4 wherein the furrow controller is operative to adjust the pivot angle by changing a vertical position of a front end of the implement frame with respect to a vertical position of a rear end of the implement frame.

6. The apparatus of claim 5 wherein the implement frame is supported on front and rear frame wheels, and wherein the furrow controller is operative to extend and retract corresponding front and rear wheel hydraulic cylinders connected to the front and rear frame wheels, and the furrow controller is operative to extend and retract the front hydraulic cylinders to move the front frame wheels up and down independent of the rear frame wheels, and the furrow controller is operative to extend and retract corresponding rear hydraulic cylinders to move the rear frame wheels up and down independent of the front frame wheels.

7. The apparatus of claim 6 comprising a lock operative to selectively secure the front and rear wheel hydraulic cylinders at an extension position where the front pivot line portion is oriented at the negative pivot angle or where the front pivot line portion is oriented at the positive pivot angle.

8. The apparatus of any one of claims 3 and 4 comprising rotatably attaching the lateral frame member to the implement frame about a frame rotational axis oriented substantially horizontally and perpendicular to the operating travel direction, and rotating the lateral frame member.

9. The apparatus of any one of claims 1-4 wherein the seed furrow opener and the fertilizer furrow opener are releasably attached to the trailing arm and wherein the separation distance is adjustable by changing locations of the seed and fertilizer furrow openers along a length of the trailing arm and by changing a vertical distance between the trailing arm and the seed and fertilizer furrow openers.

10. The apparatus of claim 9 wherein a difference between the negative separation distance and the positive separation distance is increased by increasing a distance between the locations of the seed and fertilizer furrow openers on the length of the trailing arm, and the difference between the negative separation distance and the positive separation distance is decreased by decreasing the distance between the locations of the seed and fertilizer furrow openers on the length of the trailing arm.

11. The apparatus of claim 10 wherein the furrow controller is selectively operative to change the relative positions of the seed furrow opener, the fertilizer furrow opener, and the packer wheel to selectively attain a transitional furrow configuration where the seed furrow opener engages the field surface at a transitional seed furrow depth that is between the negative seed furrow depth and the positive seed furrow depth and the fertilizer furrow opener engages the field surface at a transitional fertilizer furrow depth that is between the negative fertilizer furrow depth and the positive fertilizer furrow depth to provide a transitional separation distance that is between the negative separation distance and the positive separation distance.

12. The apparatus of claim 11 wherein the furrow controller is selectively operative to change the relative positions of the seed furrow opener, the fertilizer furrow opener, and the packer wheel to attain a desired furrow configurations as the seeding apparatus seeds into the field surface.

* * * * *